(12) United States Patent
Versteeg

(10) Patent No.: US 7,873,760 B2
(45) Date of Patent: Jan. 18, 2011

(54) EXPEDITED DIGITAL SIGNAL DECODING

(76) Inventor: William C. Versteeg, 330 Guildhall Grove, Alpharetta, GA (US) 30022

( * ) Notice: Subject to any disclaimer, the term of this patent is extended or adjusted under 35 U.S.C. 154(b) by 424 days.

(21) Appl. No.: 11/164,147

(22) Filed: Nov. 11, 2005

(65) Prior Publication Data
US 2007/0130393 A1    Jun. 7, 2007

(51) Int. Cl.
*G06F 13/14* (2006.01)
(52) U.S. Cl. .................. 710/52; 386/6; 386/7; 386/68; 710/57
(58) Field of Classification Search .......... 710/57, 710/52; 370/412, 485, 487, 413; 375/240, 375/240.2; 709/207, 224, 231, 232; 725/109, 725/111, 114, 14, 41, 43, 95; 348/725; 704/500
See application file for complete search history.

(56) References Cited

U.S. PATENT DOCUMENTS

| | | | |
|---|---|---|---|
| 5,572,347 A | 11/1996 | Burton et al. ............... 359/124 |
| 5,594,509 A | 1/1997 | Florin et al. | |
| 5,600,663 A | 2/1997 | Ayanouglu et al. ............ 371/41 |
| 5,633,683 A | 5/1997 | Rosengren et al. | |
| 6,687,167 B2 | 11/1997 | Bertin et al. ................ 370/254 |
| 5,699,365 A | 12/1997 | Klayman et al. .............. 371/55 |
| 5,699,369 A | 12/1997 | Guha .......................... 371/41 |
| 5,790,546 A | 8/1998 | Dobbins et al. | |
| 5,793,436 A | 8/1998 | Kim ............................ 348/497 |
| 5,808,662 A | 9/1998 | Kinney et al. ................. 348/15 |
| 5,815,145 A | 9/1998 | Matthews ..................... 345/327 |
| 5,870,087 A * | 2/1999 | Chau ........................... 715/202 |
| 5,913,031 A | 6/1999 | Blanchard .............. 395/200.34 |
| 5,949,795 A * | 9/1999 | Moroney et al. ............. 370/516 |
| 6,016,166 A * | 1/2000 | Huang et al. ................. 348/515 |
| 6,101,221 A * | 8/2000 | Varanasi et al. ............. 375/240 |
| 6,118,498 A | 9/2000 | Reitmeier | |
| 6,119,092 A * | 9/2000 | Patwardhan et al. ........ 704/503 |
| 6,173,115 B1 | 1/2001 | Willis .......................... 386/125 |
| 6,252,849 B1 | 6/2001 | Rom et al. ................... 370/230 |
| 6,278,716 B1 | 8/2001 | Rubenstein et al. ......... 370/432 |
| 6,307,839 B1 | 10/2001 | Gerszberg et al. ........... 370/235 |
| 6,310,918 B1 * | 10/2001 | Saha et al. ............. 375/240.16 |
| 6,453,471 B1 | 9/2002 | Klosterman | |
| 6,480,541 B1 | 11/2002 | Girod et al. ............ 375/240.12 |

(Continued)

FOREIGN PATENT DOCUMENTS

EP    0 714 192    5/1996

(Continued)

OTHER PUBLICATIONS

Sherer et al., Low Bandwidth Low Latency Channel Change, Sep. 21, 2005, U.S. Appl. No. 60/719,146.*

(Continued)

*Primary Examiner*—Cheng-Yuan Tseng
(74) *Attorney, Agent, or Firm*—Merchant & Gould

(57) ABSTRACT

Expedited digital signal decoding. A multicast or unicast data stream is sent from a headend to a set-top box at a natural rate. A decoder buffer in the set-top box begins to fill. Once the buffer is partially full, a decoder begins to decode the data at a rate lower than the natural rate. Images are displayed to the user before the buffer is full, allowing for a faster channel change.

19 Claims, 7 Drawing Sheets

U.S. PATENT DOCUMENTS

| | | | | |
|---|---|---|---|---|
| 6,510,553 | B1 | 1/2003 | Hazra | 725/87 |
| 6,538,992 | B1 | 3/2003 | Subbiah et al. | 370/230 |
| 6,594,798 | B1 | 7/2003 | Chou et al. | 370/389 |
| 6,628,301 | B1 | 9/2003 | Acton et al. | 345/716 |
| 6,665,751 | B1* | 12/2003 | Chen et al. | 710/52 |
| 6,678,332 | B1* | 1/2004 | Gardere et al. | 375/240.26 |
| 6,701,528 | B1 | 3/2004 | Arsenault et al. | 725/89 |
| 6,763,019 | B2 | 7/2004 | Mehta et al. | 725/88 |
| 6,792,047 | B1* | 9/2004 | Bixby et al. | 375/240.26 |
| 6,871,006 | B1* | 3/2005 | Oguz et al. | 386/68 |
| 6,973,667 | B2 | 12/2005 | Fritsch | 725/88 |
| 7,017,102 | B1 | 3/2006 | Kristensson et al. | 714/786 |
| 7,054,643 | B2 | 5/2006 | Trossen et al. | 455/454 |
| 7,065,779 | B1 | 6/2006 | Crocker et al. | |
| 7,073,117 | B1 | 7/2006 | Ireland et al. | 714/786 |
| 7,096,481 | B1 | 8/2006 | Forecast et al. | 725/32 |
| 7,113,484 | B1 | 9/2006 | Chapman et al. | |
| 7,114,172 | B2 | 9/2006 | Lord | 725/80 |
| 7,228,356 | B2 | 6/2007 | Nguyen et al. | 709/231 |
| 7,266,127 | B2* | 9/2007 | Gupta et al. | 370/413 |
| 7,281,058 | B1 | 10/2007 | Shepherd et al. | 709/238 |
| 0,192,820 | A1 | 8/2008 | Brooks et al. | 375/240.02 |
| 7,412,149 | B2* | 8/2008 | Cohen et al. | 386/68 |
| 7,433,946 | B2* | 10/2008 | Shen et al. | 709/223 |
| 7,447,978 | B2 | 11/2008 | Hannuksela | 714/776 |
| 7,477,653 | B2* | 1/2009 | Smith et al. | 370/432 |
| 7,490,344 | B2* | 2/2009 | Haberman et al. | 725/98 |
| 7,584,404 | B2 | 9/2009 | Kozintsev et al. | 714/776 |
| 7,610,606 | B2 | 10/2009 | Carlucci et al. | 725/95 |
| 7,620,294 | B2* | 11/2009 | Green et al. | 386/68 |
| 7,725,797 | B2 | 5/2010 | Ver Steeg | 714/751 |
| 7,729,590 | B2* | 6/2010 | Kosugi | 386/68 |
| 7,742,407 | B2 | 6/2010 | Versteeg et al. | 370/230 |
| 2001/0025378 | A1 | 9/2001 | Sakamoto et al. | |
| 2002/0019853 | A1 | 2/2002 | Vange et al. | |
| 2002/0056107 | A1 | 5/2002 | Schlack et al. | 725/35 |
| 2002/0057367 | A1 | 5/2002 | Baldock | 348/554 |
| 2002/0067909 | A1 | 6/2002 | Iivonen | 386/88 |
| 2002/0129129 | A1 | 9/2002 | Bloch et al. | 717/175 |
| 2002/0181454 | A1 | 12/2002 | Norman et al. | |
| 2002/0184637 | A1 | 12/2002 | Perlman | 725/87 |
| 2002/0199203 | A1 | 12/2002 | Duffy et al. | |
| 2003/0002849 | A1 | 1/2003 | Lord | 386/46 |
| 2003/0007212 | A1 | 1/2003 | Sala et al. | 398/72 |
| 2003/0007507 | A1 | 1/2003 | Rajwan et al. | 370/468 |
| 2003/0007508 | A1 | 1/2003 | Sala et al. | 370/468 |
| 2003/0007724 | A1 | 1/2003 | Gummalla et al. | 385/24 |
| 2003/0014752 | A1 | 1/2003 | Zaslavsky et al. | 725/40 |
| 2003/0048808 | A1* | 3/2003 | Stahl et al. | 370/487 |
| 2003/0133458 | A1* | 7/2003 | Sato et al. | 370/395.6 |
| 2003/0156218 | A1 | 8/2003 | Laksono | 709/231 |
| 2003/0159143 | A1 | 8/2003 | Chan | 725/41 |
| 2003/0188253 | A1 | 10/2003 | Kauschke et al. | 714/755 |
| 2003/0188311 | A1 | 10/2003 | Yuen et al. | 725/42 |
| 2003/0196211 | A1 | 10/2003 | Chan | 725/131 |
| 2003/0200551 | A1 | 10/2003 | Kang | 725/120 |
| 2003/0217365 | A1 | 11/2003 | Caputo | 725/95 |
| 2004/0111470 | A1 | 6/2004 | Poulsen et al. | 709/204 |
| 2004/0133907 | A1 | 7/2004 | Rodriguez et al. | |
| 2004/0184776 | A1 | 9/2004 | Inoue et al. | 386/83 |
| 2004/0194147 | A1 | 9/2004 | Craven et al. | 725/111 |
| 2004/0204945 | A1* | 10/2004 | Okuda et al. | 704/500 |
| 2004/0226044 | A1 | 11/2004 | Goode | 725/95 |
| 2004/0228277 | A1 | 11/2004 | Williams | |
| 2004/0260814 | A1 | 12/2004 | Budge et al. | 709/227 |
| 2005/0155075 | A1 | 7/2005 | Crichton | 725/105 |
| 2005/0166242 | A1 | 7/2005 | Matsumoto et al. | 725/88 |
| 2005/0172326 | A1 | 8/2005 | Jerding et al. | 725/116 |
| 2005/0190781 | A1 | 9/2005 | Green et al. | |
| 2005/0204251 | A1 | 9/2005 | Moon et al. | 714/748 |
| 2005/0228892 | A1 | 10/2005 | Riley et al. | 709/228 |
| 2005/0289618 | A1 | 12/2005 | Hardin | 725/95 |
| 2005/0289623 | A1 | 12/2005 | Midani et al. | 725/100 |
| 2006/0013247 | A1 | 1/2006 | Koch et al. | 370/437 |
| 2006/0025149 | A1 | 2/2006 | Karaoguz et al. | 455/452.2 |
| 2006/0074968 | A1 | 4/2006 | Gyetko | 707/102 |
| 2006/0080707 | A1 | 4/2006 | Laksono | 725/38 |
| 2006/0212917 | A1 | 9/2006 | Boucher et al. | 725/105 |
| 2006/0236358 | A1 | 10/2006 | Liu et al. | 725/117 |
| 2006/0242240 | A1* | 10/2006 | Parker et al. | 709/205 |
| 2007/0002789 | A1 | 1/2007 | Zhang | 370/328 |
| 2007/0044130 | A1 | 2/2007 | Skoog | 725/110 |
| 2007/0098015 | A1 | 5/2007 | Eijsberg | 370/468 |
| 2007/0104226 | A1 | 5/2007 | Ver Steeg et al. | 370/485 |
| 2007/0106782 | A1 | 5/2007 | Ver Steeg et al. | 709/224 |
| 2007/0107023 | A1 | 5/2007 | Ver Steeg et al. | 725/95 |
| 2007/0107024 | A1 | 5/2007 | Ver Steeg et al. | 725/95 |
| 2007/0186228 | A1 | 8/2007 | Ramaswamy et al. | 725/14 |
| 2007/0192812 | A1 | 8/2007 | Pickens et al. | 725/94 |
| 2007/0220577 | A1 | 9/2007 | Kongalath | 725/131 |
| 2007/0261087 | A1 | 11/2007 | Denney et al. | 725/95 |
| 2008/0008167 | A1 | 1/2008 | Ver Steeg | 370/389 |
| 2008/0022190 | A1 | 1/2008 | Ver Steeg | 714/776 |
| 2008/0022320 | A1 | 1/2008 | Ver Steeg | 725/78 |
| 2008/0028279 | A1 | 1/2008 | Ver Steeg | 714/776 |
| 2008/0028280 | A1 | 1/2008 | Ver Steeg | 714/776 |
| 2008/0109692 | A1 | 5/2008 | Ver Steeg | 714/746 |
| 2008/0134005 | A1 | 6/2008 | Izzat et al. | 714/774 |
| 2008/0229379 | A1 | 9/2008 | Akhter | 725/139 |
| 2008/0244667 | A1 | 10/2008 | Osborne | 725/94 |
| 2008/0244679 | A1 | 10/2008 | Sukumar et al. | 725/121 |
| 2009/0007199 | A1 | 1/2009 | La Joie | 725/95 |
| 2009/0031342 | A1 | 1/2009 | Ver Steeg et al. | 725/38 |
| 2009/0031392 | A1 | 1/2009 | Ver Steeg et al. | 725/151 |
| 2009/0222875 | A1 | 9/2009 | Cheng et al. | 725/147 |
| 2010/0046634 | A1 | 2/2010 | Dai et al. | 375/240.25 |

FOREIGN PATENT DOCUMENTS

| | | |
|---|---|---|
| EP | 1294193 A | 3/2003 |
| WO | WO 99/09741 A | 2/1999 |
| WO | WO 2005/020556 | 3/2005 |
| WO | WO 2006/019505 | 2/2006 |
| WO | WO 2006/061765 | 6/2006 |
| WO | WO 2007/111693 | 10/2007 |
| WO | WO 2007/111695 | 10/2007 |
| WO | WO 2007/111697 | 10/2007 |
| WO | WO 2007/120260 | 10/2007 |
| WO | WO 2007/120261 | 10/2007 |
| WO | WO 2008/006011 | 1/2008 |
| WO | WO 2008/006012 | 1/2008 |
| WO | WO 2008/006013 | 1/2008 |
| WO | WO 2008/006014 | 1/2008 |
| WO | WO 2008/048828 | 4/2008 |
| WO | WO 2008/118678 | 10/2008 |
| WO | WO 2008/121545 | 10/2008 |
| WO | WO 2009/018042 | 2/2009 |
| WO | WO 2009/018043 | 2/2009 |

OTHER PUBLICATIONS

U.S. Appl. No. 10/080,380, filed Feb. 21, 2002, Entitled "Systems and Methods for Generating a Real-Time Video Program Guide Through Video Access of Multiple Channels," Inventor: Peter Chan.

U.S. Appl. No. 10/119,700, filed Apr. 10, 2002, Entitled "Systems, Methods and Apparatuses for Simulated Rapid Tuning of Digital Video Channels," Inventor: Peter Chan.

U.S. Appl. No. 11/164,102, filed Nov. 10, 2005, Entitled "Quality of Service Management in a Switched Digital Video Environment," Inventors: William C. VerSteeg, et. al.

U.S. Appl. No. 11/164,110, filed Nov. 10, 2005, Entitled "Channel Changes Between Services with Differing Bandwidth in a Switched Digital Video System," Inventors: William C. VerSteeg, et. al.

U.S. Appl. No. 11/164,115, filed Nov. 10, 2005, Entitled "Atomic Channel Changes in a Switched Digital Video System," Inventors: William C. VerSteeg, et. al.
U.S. Appl. No. 11/164,119, filed Nov. 10, 2005, Entitled "Bandwidth Management in Each Network Device in a Switched Digital Video Environment," Inventors: William C. VerSteeg, et al.
U.S. Appl. No. 11/428,336, filed Jun. 30, 2006, Entitled "Systems and Methods of Synchoronizing Media Streams," Inventor: William C. VerSteeg.
U.S. Appl. No. 11/550,441, filed Oct. 18, 2006, Entitled "Reducing Channel Change Time," Inventor: William C. VerSteeg.
U.S. Appl. No. 11/829,255, filed Jul. 27, 2007, Entitled "Systems and Methods of Differentiated Channel Change Behavior," Inventors: William C. VerSteeg, et al.
U.S. Appl. No. 11/829,274, filed Jul. 27, 2007, Entitled "Systems and Methods of Differentiated Requests for Network Access," Inventors: William C. VerSteeg et al.
European Patent Application, EP 1 335 521, Oct. 24, 2002.
European Patent Application, EP 1 589 706, Apr. 19, 2004.
Eurupean Patent Application, EP 1 684 450, Oct. 26, 2004.
U.S. Official Action dated Mar. 5, 2007 in U.S. Appl. No. 10/080,380.
U.S. Official Action dated Sep. 19, 2007 in U.S. Appl. No. 10/080,380.
U.S. Official Action dated Dec. 14, 2007 in U.S. Appl. No. 10/119,700.
U.S. Official Action dated Apr. 8, 2008 in U.S. Appl. No. 10/080,380.
U.S. Official Action dated Jul. 1, 2008 in U.S. Appl. No. 10/119,700.
U.S. Official Action dated Jul. 11, 2008 in U.S. Appl. No. 11/164,110.
U.S. Official Action dated Aug. 21, 2008 in U.S. Appl. No. 11/428,336.
U.S. Official Action dated Sep. 3, 2008 in U.S. Appl. No. 11/164,115.
U.S. Official Action dated Sep. 19, 2008 in U.S. Appl. No. 11/164,102.
U.S. Official Action dated Nov. 17, 2008 in U.S. Appl. No. 10/119,700.
U.S. Official Action dated Dec. 1, 2008 in U.S. Appl. No. 10/080,380.
U.S. Official Action dated Jan. 8, 2009 in U.S. Appl. No. 11/164,110.
U.S. Official Action dated Jan. 9, 2009 in U.S. Appl. No. 11/164,119.
U.S. Official Action dated Feb. 2, 2009 in U.S. Appl. No. 11/482,439.
U.S. Official Action dated Feb. 12, 2009 in U.S. Appl. No. 11/428,336.
U.S. Official Action dated Feb. 19, 2009 in U.S. Appl. No. 11/164,115.
U.S. Official Action dated Mar. 24, 2009 in U.S. Appl. No. 11/164,102.
U.S. Official Action dated Apr. 29, 2009 in U.S. Appl. No. 11/692,457.
U.S. Official Action dated Apr. 30, 2009 in U.S. Appl. No. 10/119,700.
U.S. Official Action dated Jun. 23, 2009 in U.S. Appl. No. 11/428,336.
U.S. Official Action dated Jun. 23, 2009 in U.S. Appl. No. 11/691,565.
U.S. Official Action dated Jul. 17, 2009 in U.S. Appl. No. 11/164,119.
U.S. Official Action dated Jul. 31, 2009 in U.S. Appl. No. 11/482,439.
U.S. Official Action dated Aug. 5, 2009 in U.S. Appl. No. 11/164,110.
U.S. Official Action dated Aug. 5, 2009 in U.S. Appl. No. 11/164,115.
U.S. Official Action dated Aug. 18, 2009 in U.S. Appl. No. 11/164,102.
U.S. Official Action dated Sep. 11, 2009 in U.S. Appl. No. 11/482,437.
U.S. Official Action dated Sep. 18, 2009 in U.S. Appl. No. 11/482,436.
U.S. Official Action dated Sep. 18, 2009 in U.S. Appl. No. 11/482,438.
U.S. Official Action dated Oct. 20, 2009 in U.S. Appl. No. 11/692,457.
U.S. Official Action dated Nov. 23, 2009 in U.S. Appl. No. 11/164,115.
U.S. Official Action dated Nov. 24, 2009 in U.S. Appl. No. 10/119,700.
U.S. Official Action dated Dec. 21, 2009 in U.S. Appl. No. 11/428,336.
U.S. Official Action dated Jan. 6, 2010 in U.S. Appl. No. 11/691,565.
U.S. Official Action dated Jan. 14, 2010 in U.S. Appl. No. 11/164,110.
U.S. Official Action dated Jan. 22, 2010 in U.S. Appl. No. 11/164,119.
U.S. Official Action dated Jan. 29, 2010 in U.S. Appl. No. 11/692,457.
U.S. Official Action dated Feb. 26, 2010 in U.S. Appl. No. 11/482,438.
International Search Report dated Oct. 29, 2007, PCT/US2006/060713.
International Search Report dated Dec. 10, 2007, PCT/US2007/072825.
International Search Report dated Dec. 20, 2007, PCT/US2006/060703.
International Search Report dated Dec. 20, 2007, PCT/US2006/060709.
International Search Report dated Jan. 11, 2008, PCT/US2007/072819.
International Search Report dated Feb. 15, 2008, PCT/US2007/072820.
International Search Report dated May 6, 2008, PCT/US2007/072822.
International Search Report dated May 23, 2008, PCT/US2007/080869.
International Search Report dated Jul. 10, 2008, PCT/US08/070851.
International Search Report dated Jul. 15, 2008, PCT/US2006/060695.
International Search Report dated Jan. 16, 2008, PCT/US2006/060700.
International Search Report dated Sep. 22, 2008, PCT/US2008/057296.
International Search Report dated Oct. 7, 2008, PCT/US08/070853.
International Search Report dated Nov. 12, 2008, PCT/US2008/057297.
Written Opinion dated Oct. 29, 2007, PCT/US2006/060713.
Written Opinion dated Dec. 20, 2007, PCT/US2006/060703.
Written Opinion dated Dec. 20, 2007, PCT/US2006/060709.
Written Opinion dated Jan. 16, 2008, PCT/US2006/060700.
Written Opinion dated Feb. 15, 2008, PCT/US2007/072820.
Written Opinion dated May 22, 2008, PCT/US2006/060703.
Written Opinion dated Jul. 10, 2008, PCT/US2008/070851.
Written Opinion dated Jul. 15, 2008, PCT/US2006/060695.
Written Opinion dated Sep. 22, 2008, PCT/US2008/057296.
Written Opinion dated Nov. 12, 2008, PCT/US2008/057297.
Written Opinion dated Apr. 30, 2009, PCT/US2007/080869.
IPR dated Feb. 2, 2010, PCT/US2008/070851.
IPR dated Feb. 2, 2010, PCT/US2008/070853.
Office Action for EP 06 850 729.2 dated Jan. 27, 2009.
Office Action for EP 07 812 632.3 dated Apr. 22, 2009.
Office Action for EP 07 840 350.8 dated Apr. 28, 2009.
Office Action for EP 07 812 635.6 dated May 6, 2009.
Office Action for EP 06 850 128.7 dated Jul. 17, 2009.
Office Action for EP 07 812 631.5 dated Oct. 2, 2009.
Office Action for EP 07 812 632.3 dated Oct. 23, 2009.
Canadian Office Action dated Feb. 8, 2010.
"Digital Video Broadcasting (DVB); DVB-H Implementation Guidelines European Broadcasting Union, Union Europeenne de Radio-Television EBUUER; ETSI TR 102 377" ETSI Standards, Lis, vol. BC, No. V1.2.1, Nov. 1, 2005, XP014032216, ISSN: 0000-0001, pp. 27, 59.
Bormans J. et al., "Video coding with H.264/AVC: tools, performance, and complexity" IEEE Circuits and Systems Magazine, IEEE Service Center, New York, NY, US, vol. 4, No. 1, Jan. 1, 2004, pp. 7-28, XP011111220, ISSN: 1531-636X.
Sherer, et al. "Appendix A Low Bandwidth Low Latency Channel Change," U.S. Appl. No. 60/719146, filed Sep. 21, 2005.
Shoaf et al. "IGMP Capabilities in Broadband Network Architercures", Whitepaper Juniper Networks, Mar. 1, 2005, pp. 1-25, XP002999116, pp. 1-31.
Cain et al.: "Internet Group Management Protocol, Version 3; rfc3376.txt" IETF Standard, Internet Engineering Task Force, IETF, Ch, Oct. 1, 2002, XP015009135, ISSN: 000-0003, pp. 1-47.

Jean-Louis Gauvreau, et al.: Optimal Coding Rate of Punctured Convolutional Codes in Multiservice Wireless Cellular Systems: IEEE Transactions on Vehicular Technology, IEEE Service Center, Piscataway, NJ, vol. 48, No. 1, Jan. 1999, XP011063794, p. 117.

De M Cordeiro C. et al., "Establishing a Trade-off Between Unicast and Multicast Retransmission Modes for Reliable Multicast Protocols." Modeling Analysis and Simulation of Computer and Telecommunication Systems, Aug. 29, 2000, pp. 85-91, XP010515402.

Gemmell, Jim. "Scalable Reliable Multicast Using Erasure-Correcting Re-sends." Microsoft Research, Technical Report MSR-TR-97-20, [Online] Jun. 30, 1997, pp. 1-15, XP002461839.

Lee, Min Jeong et al. "Peformance Improvements of Wireless IP Multicast Conference System based on Designated Receivers," IEEE International Conference on Atlanta, GA, USA, vol. 2, Jun. 7, 1998 -Jun. 11, 1998, pp. 807-811, XP010284688.

Nonnemacher, J. et al. "Parity-Based Loss Recovery for Reliable Multicast Transmission." IEEE/ACM Transactions on Networking, vol. 6, No. 4, Aug. 1998, pp. 349-361, XP000771969.

Paul, Sanjoy et al. "Reliable Multicast Transport Protocol (RMTP)" IEEE Journal on Selected Areas in Communications, vol. 15, No. 3, Apr. 1997, XP011054624.

Rizzo, Luigi et al. "RMDP: An FEC-based Reliable Multicast Protocol for Wireless Environments." Mobile Computing and Communications Review, vol. 2, No. 2, Apr. 1998, pp. 23-31, XP000738504.

Kemdore, R.G. "Scoped Hybrid Automatic Repeat reQuest with Forward Error Correction (SHARQFEC)." Computer Communication Review, ACM, New York, NY, vol. 28, No. 4, Oct. 1998, pp. 278-289, XP000914442.

Lacher, M.S., et al. "Performance Comparison of Centralized Versus Distributed Error Recovery for Reliable Multicast." IEEE/ACM Transactions on Networking, IEEE/ACM, New York, NY, vol. 8, No. 2, Apr. 2000, XP011038850.

Liu Wenjie et al.: "Prioritized admission strategy in a clustered video-on-demand system", IEEE Tencon' 02. 2002 IEEE Region 10 Conference on Computers, Communications, Control and Power Engineering Proceedings. Beijing, China , Oct. 28-31, 2002; New York, NY, vol. 1, Oct. 28, 2002, pp. 306-309, XP010628485, ISBN: 978-0-7803-7490-4.

Fitzek et al., "Error Control Teqhniques for Efficient Multicast Streaming in UMTS Networks"; Proceeding of Systemics, Cybernetics and Informatics SCI 2003 [Online] 2003, XP002477506 Orlando, Florida USA. Retrieved from the Internet URL:http//kom.aau.dk/ {ff/documents/SCI_2003.pdf> [retrieved on Apr. 21, 2008] pp. 4-5, figure 4.

Rummler et al., "Performance of Parity-Based Loss Recovery for Reliable Multicast in Third-General Mobile Networks"; Personal, Indoor and Mobile Radio Communications, 2005. PIMRC 2005. IEEE 16th International Symposium on Berlin, Germancy Sep. 11-14, 2005, Piscataway, NJ, USA, IEEE Sep. 11, 2005; pp. 1641-1645, XP010926492.

Rubenstein et al., "Improving Reliable Multicast Using Active Parity Encoding Services"; (APES), 1999, IEEEE, pp. 1248-1255.

U.S. Official Action dated Mar. 19, 2010 in U.S. Appl. No. 11/550,441.

U.S. Official Action dated Mar. 24, 2010 in U.S. Appl. No. 11/829,255.

U.S. Official Action dated Mar. 25, 2010 in U.S. Appl. No. 11/829,274.

U.S. Official Action dated May 10, 2010 in U.S. Appl. No. 11/164,115.

U.S. Official Action dated Jun. 3, 2010 in U.S. Appl. No. 11/428,336.

U.S. Official Action dated Jun. 7, 2010 in U.S. Appl. No. 11/482,439.

Office Action for EP 07 844 052.6 dated May 18, 2010.

U.S. Official Action dated Jun. 22, 2010 in U.S. Appl. No. 11/164,119.

U.S. Official Action dated Jun. 23, 2010 in U.S. Appl. No. 11/691,565.

Office Action for EP 07 812 632.3 dated Apr. 19, 2010.

U.S. Official Action dated Jul. 22, 2010 in U.S. Appl. No. 11/692,457.

Chinese Patent Application, CN 1509027A, Jun. 30, 2004.

U.S. Official Action dated Sep. 1, 2010 in U.S. Appl. No. 11/829,255.

Canadian Office Action dated Jul. 30, 2010, Application No. 2,629,310.

Chinese Office Action dated Aug. 10, 2010, Application No. 200780038707.

U.S. Official Action dated Sep. 17, 2010 in U.S. Appl. No. 11/829,274.

U.S. Official Action dated Sep. 27, 2010 in U.S. Appl. No. 11/692,457.

* cited by examiner

_US 7,873,760 B2_

EXPEDITED DIGITAL SIGNAL DECODING

FIELD OF THE INVENTION

This invention relates in general to broadband communications systems, and more particularly, to the use of a decoder buffer and particular data rates to perform an expedited channel alteration.

BACKGROUND

A broadband communications system includes data sources, a broadcasting network, a headend unit, and edge devices. The data sources can be encoders and video sources that send data through an uplink to the broadcasting network. In the broadcasting network, three common types of signals received at the headend include off-air signals, satellite signals, and local origination signals. The satellite signals include any signal transmitted from an earth station to an orbiting satellite which are then retransmitted back down to earth. The signals are transmitted from earth to the orbiting satellite on a path referred to as the uplink. These signals are then received by a transponder on the satellite and are retransmitted from the transponder to a receiving earth station over a downlink. The transponder amplifies the incoming signal and changes its frequency for the downlink journey to avoid interference with uplink signals.

The headend (HE) or central office is where signals from multiple sources are received and are conditioned and prepared for transmission over an access network to subscribers. Once signals have been prepared for delivery, they are combined onto a medium to be sent over the access network to the customer premise devices. Conditioning may include conversion of analog to digital, digital bit-rate conversion, conversion from variable bit rate to constant or clamped bit rate, conversion of multiple-program transport streams to single-program transport streams or any other type of grooming or combination of these. The medium may include coaxial, twisted pair or other cable, optical fiber, or some form of wireless transmission. The preparation for transmission in edge devices may include generation of an RF carrier, modulation, conversion to optical, frequency division multiplexing, time division multiplexing, wavelength division multiplexing or any combination of these.

Edge devices vary depending on the type of network, and include the headend output devices. These edge devices sometime overlap with or extend into an access network. The fiber access network can include an optical line terminal (OLT), an optical node terminal (ONT), and customer premises devices inside the home. Therefore, the OLT and ONT may be considered either an edge device or an access network device. However, the ONT may at times be considered a customer premises device.

A hybrid fiber/coax (HFC) network typically uses modulator edge devices. An HFC access network can include RF to optical converters, optical to RF converters, optical and RF amplifiers, optical and RF combiners, splitters and taps. HFC customer premises devices include RF modems and set-top boxes.

A digital subscriber line (DSL) network can include a digital subscriber line access multiplexer (DSLAM). DSL modems are usually located in customer premises. The OLTs, modulators, and DSLAMs, also known as edge devices, service numerous user homes, such as a neighborhood in a city. Customer premise devices can include modems, routers, personal computers, set-top boxes (STB), etc.

FIG. 1 illustrates a satellite broadcast network 100. At an uplink facility 110, program content is stored on video servers controlled by a broadcast automation system. Any analog content at a network operations center (NOC) 120 is compressed using encoders and then multiplexed with the content delivered from the video file servers. The NOC 120 is responsible for overall control and co-ordination of the uplink and the downlink sites. A headend (HE) 130 may include a network groomer 140 for generating multicast data streams such as video, audio, and/or data signals. The headend 130 also has numerous decoders which preferably each have a mass storage device, such as a hard disk drive. The standard encoding technique proposed by the Moving Pictures Experts Group (MPEG) uses a variable length coding method. Accordingly, the amount of the data output from an encoder of a transmitter varies according to a change in a scene or the magnitude of motion in an image input from an external information source. Therefore, it is required that the occupancy level of a buffer in a set-top box, which stores a received signal, is appropriately controlled.

Problems occur when tuning to a digital channel because the MPEG buffer must fill before starting to decode and display images. This can take up to two seconds and negatively impacts channel change times. If playback begins before the buffer is full, underflow may result. What is needed is a means to facilitate fast channel change before the buffer is full.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION

The embodiments of the invention can be understood in the context of a broadband communications system. Note, however, that the invention may be embodied in many different forms and should not be construed as limited to the embodiments set forth herein. For example, transmitted broadband signals may include at least one of video/audio, telephony, data, or Internet Protocol (IP) signals, to name but a few. All examples given herein, therefore, are intended to be non-limiting and are provided in order to help clarify the description of the invention.

Set-top boxes tune to data streams coming from the HE 130 in a broadcast network which could be composed of fiber, hybrid fiber/coax, or xDSL. These broadcast networks are described in copending U.S. patent application Ser. No. 11/164,102, entitled "Quality of Service Management in a Switched Digital Video Environment", U.S. patent application Ser. No. 11/164,110, entitled "Channel Changes Between Services with Differing Bandwidth in a Switched Digital Video System", U.S. patent application Ser. No. 11/164,115, entitled "Atomic Channel Changes in a Switched Digital Video System", and U.S. patent application Ser. No. 11/164,119, entitled "Bandwidth Management in Each Network Device in a Switched Digital Video Environment", all filed Nov. 10, 2005, the disclosures and teachings of which are hereby incorporated by reference.

An MPEG buffer, or decoder buffer, in the set-top box must completely fill with the incoming data stream before starting to decode and display images or underflow will occur. The incoming data stream can be in numerous formats, such as MPEG2, MPEG4, VC1, audio formats, or any other format known to those skilled in the art.

Figure 1:
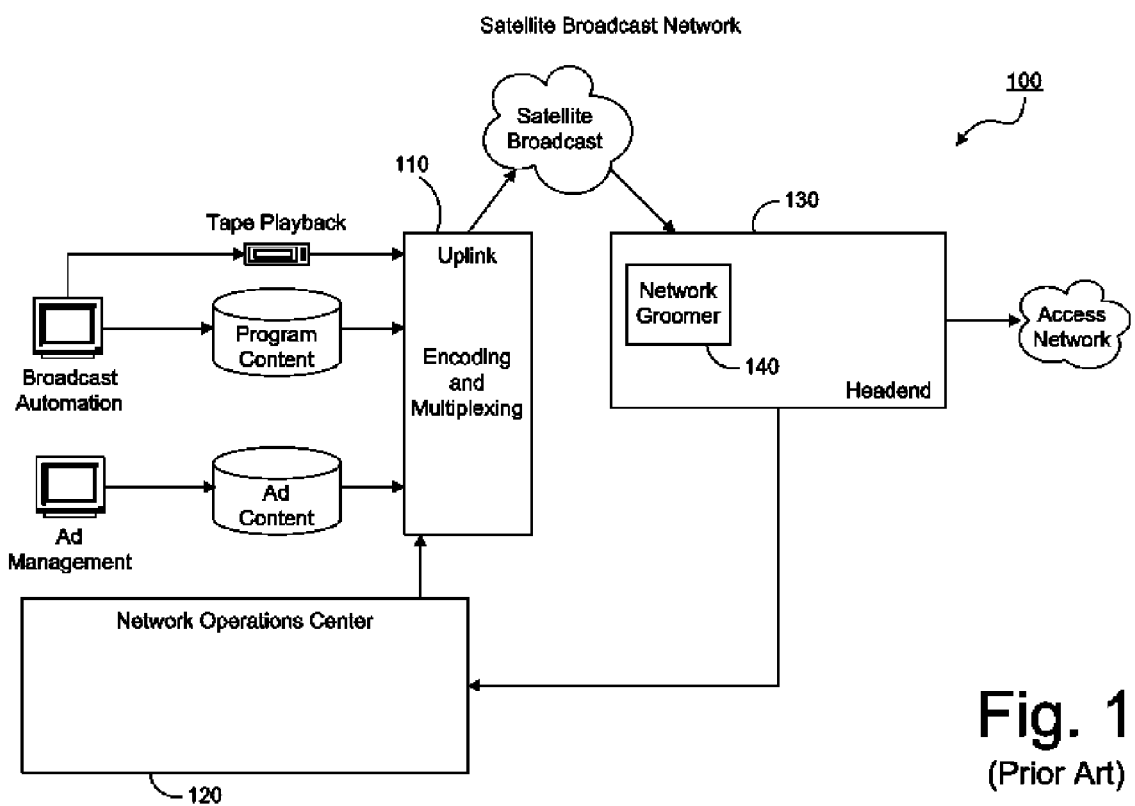
FIG. 1 illustrates a satellite broadcast system with an uplink, headend, and network operations center.
Figure 2:
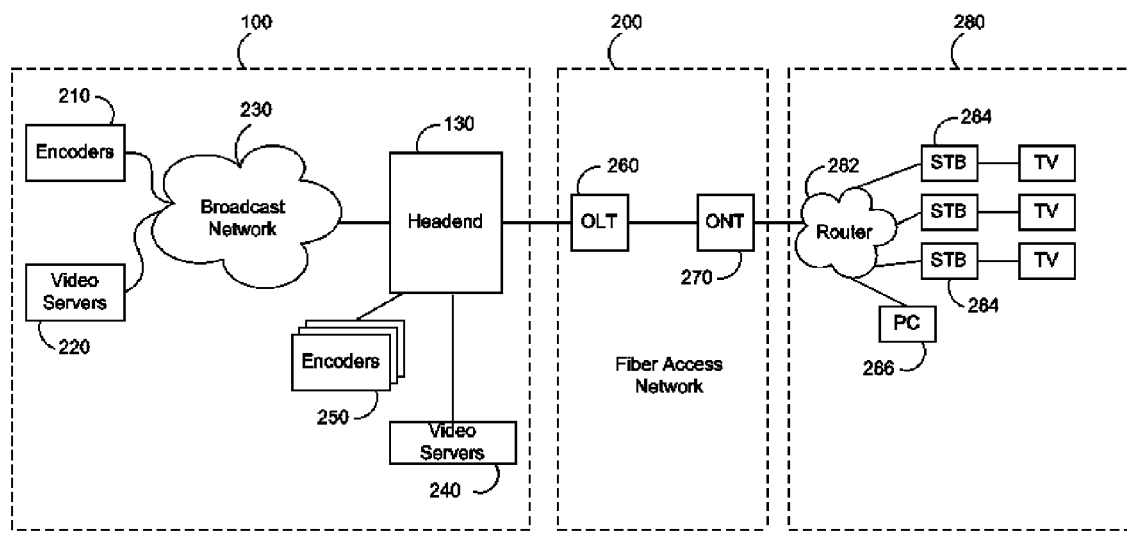
FIG. 2 illustrates the system of FIG. 1 in combination with a fiber access network and a customer premises network.

FIG. 2 illustrates the satellite broadcast system 100 of FIG. 1 in combination with a fiber access network 200 and a customer premises network 280. Encoders 210 and video servers 220 are the data sources that feed a broadcast network 230 of the satellite broadcast system 100. Video servers 240 and encoders 250 located at the HE 130 are used to insert local programming. The HE 130 of the satellite broadcast system 100 receives signals from multiple sources, conditions them and prepares them for transmission over the access network 200. Once signals have been prepared for transmission from the HE 130, they are combined onto the access network media. In a fiber access network 200 an optical line terminal (OLT) 260 transmits downstream to optical network terminals (ONT) 270 which are located outside the customer premises network 280. The OLT 260 is responsible for allocating necessary upstream bandwidths to the ONTs 270 by issuing data grants in an appropriate manner. Inside the customer premises network 280, the signals can be split and combined using a router 282, or other device, and then fed to various devices, such as one or more set-top boxes (STBs) 284 or personal computers (PCs) 286.

Figure 3:
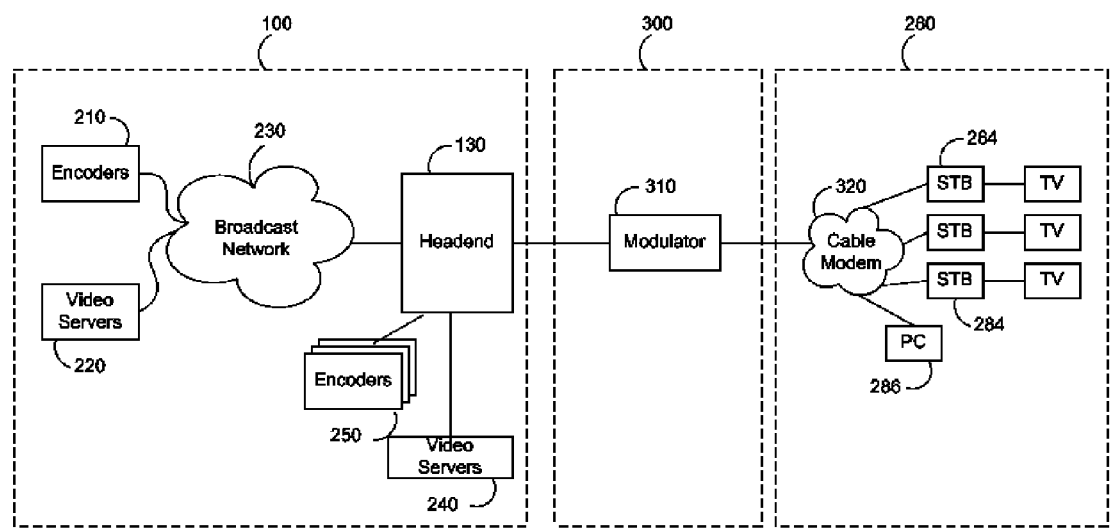
FIG. 3 illustrates the system of FIG. 1 in combination with a hybrid fiber/coax access network and a customer premises network.

FIG. 3 illustrates the satellite broadcast system 100 of FIG. 1 in combination with a hybrid fiber/coax (HFC) access network 300 and the customer premises network 280. The components used for the HFC access network 300 are similar to those used for the fiber access network 200. However, instead of the OLT 260 and the ONT 270, the hybrid fiber/coax network 300 uses an edge modulator 310. Inside the customer premises network 280, the signal is received by a cable modem 320 and sent to various devices, such as one or more STBs, also known as home communication terminals, 284 or PCs 286. RF STBs may interface to the HFC access network 300 directly using internal modems.

Figure 4:
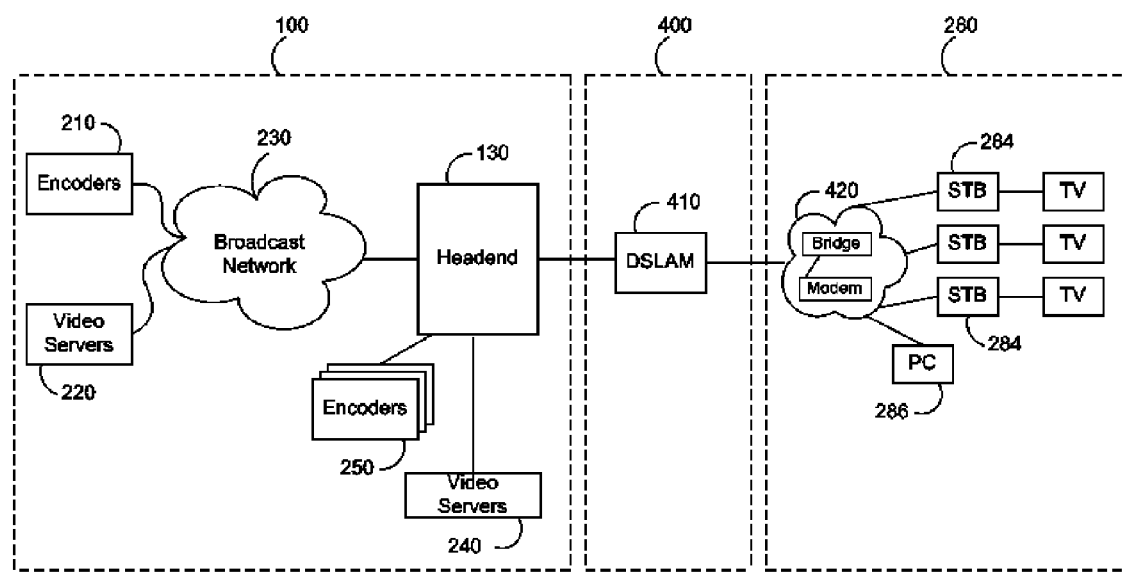
FIG. 4 illustrates the system of FIG. 1 in combination with a DSL access network and a customer premises network.

FIG. 4 illustrates the satellite broadcast system 100 of FIG. 1 in combination with a DSL access network 400 and the customer premises network 280. The components used for the DSL access network 400 are similar to those used in the fiber access network 200 and the HFC access network 300 except for the edge devices. Instead of the OLT 260 and the ONT 270 or the modulator 310, the DSL access network 400 has a digital subscriber line access multiplexer (DSLAM) 410 that links numerous users to a single high-speed ATM line. Inside the customer premises network 280, the signal is received by a local network 420 possibly containing a modem and bridge router. The signal is split there and fed to various devices, such as one or more STBs 284 or PCs 286.

Figure 5:
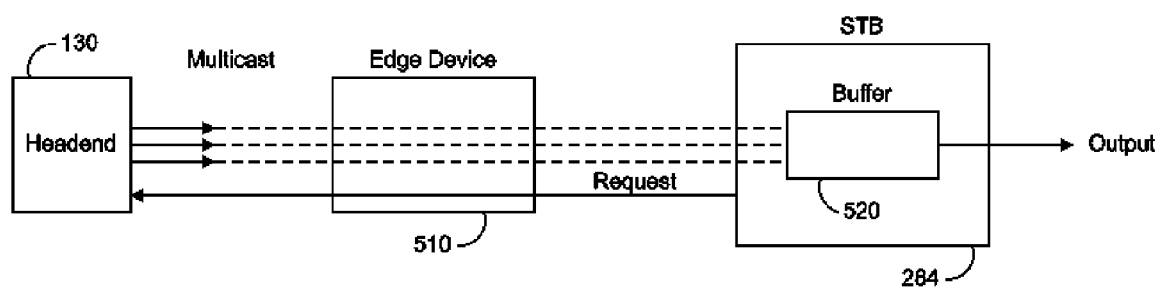
FIG. 5 illustrates multicast data flow from a headend to a set-top box.

FIG. 5 illustrates multicast data flow, which is the simultaneous delivery of information to a group of devices, from the HE 130. The STB 284 requests a signal and the HE 130 sends the multicast data flow over an edge device 510 to the STB 284. The STB 284 tunes to the multicast video stream and a decoder/dejitter buffer 520 in the STB 284 fills with packets directly from the multicast video stream. The data stream is typically entering the buffer 520 at a natural stream rate. However, when a key frame, such as an I frame, is received and the buffer 520 is partially full, the decoder may start to output the data at a rate lower than the natural stream rate. This allows the buffer to continue filling while images are displayed to the user. Because data is output from the buffer 520 before the buffer is full, the user experiences faster channel changes or alterations without experiencing buffer underflow.

Once the buffer 520 is full, the output rate will increase to the natural stream rate. For example, if a video stream is entering the buffer 520 at a natural stream rate of three megabytes per second, the output rate from the decoder will be less, such as 2.5 megabytes per second. This gives the buffer 520 time to fill completely, but also allows the user to receive the requested data before the buffer 520 is full. Once the buffer 520 is completely full, the output rate from the decoder will increase to the natural stream rate which in this case is three megabytes per second.

Figure 6:
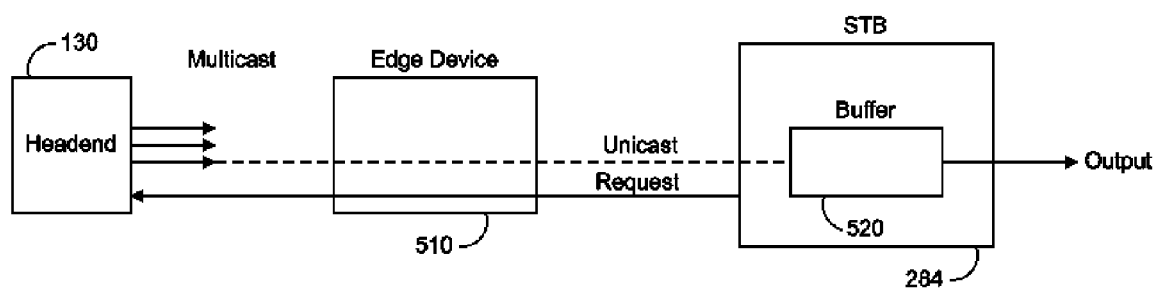
FIG. 6 illustrates a unicast data flow from a headend to a set-top box.

FIG. 6 illustrates a unicast data flow, which is a single stream of data, from the HE 130 to the STB 284. This unicast flow may be a flow destined only to this STB 284, for instance VOD. This unicast flow may also be a flow associated with quickly filling buffer 520 prior to tuning to a multicast flow. The STB 284 requests a signal and the HE 130 sends out the unicast data flow over the edge device 510. The STB 284 tunes to the unicast video stream, and the decoder buffer 520 in the STB 284 fills with packets directly from the unicast video stream. Because the input into the buffer 520 of FIG. 6 is a unicast data flow, the input rate into the STB 284 may be faster than or equal to the natural rate. When a key frame, such as an I frame, is received and the buffer 520 is partially full, the decoder may start to output the data at a rate lower than the natural stream rate. After a period of time or a set buffer occupancy level, the STB 284 may switch from the unicast data flow to a multicast data flow. The buffer 520 will continue to fill and, once full, the decoder will then decode at the natural stream rate.

Figure 7:
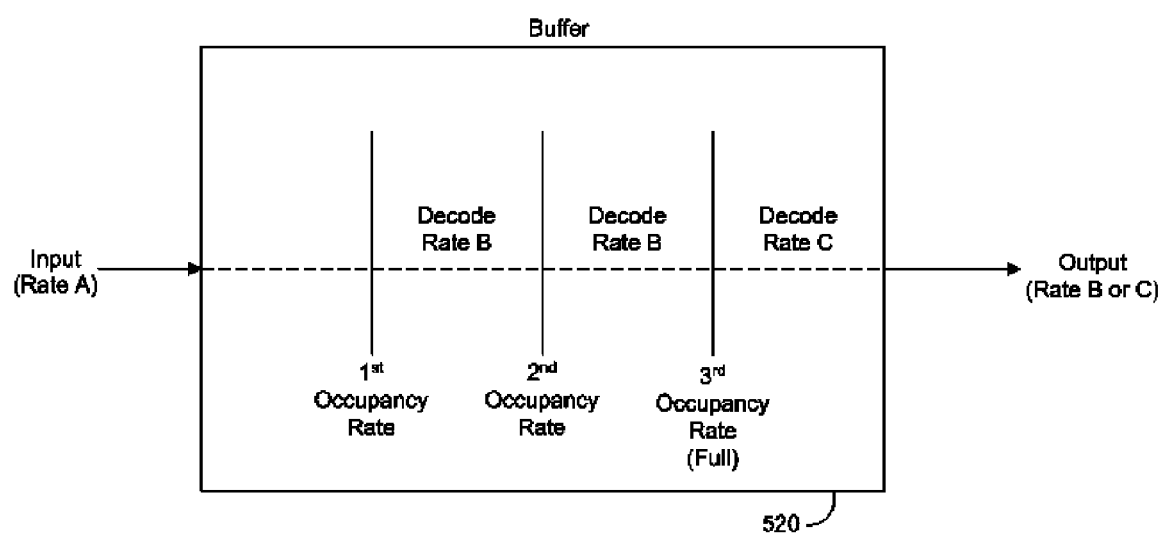
FIG. 7 illustrates buffer occupancy levels and corresponding data flow rates.

FIG. 7 illustrates buffer occupancy levels and corresponding data flow rates. For purposes of this illustration, buffer occupancy increases from the left side of the buffer 520 to the right side of the buffer 520. Therefore, the varying output data flow from the buffer 520 is illustrated in conjunction with the varying occupancy level of the buffer 520. The data stream, whether a multicast or unicast stream, is input to the buffer 520 at a natural stream rate or a rate faster than the natural stream rate, for example Rate A. When a first occupancy level is reached in the buffer, the decoder begins decoding the data and outputting the data at a rate lower than the natural stream rate, such as Rate B. At a second occupancy level, the data stream could change from a unicast stream to a multicast stream, remain a unicast stream, or remain a multicast stream. When the buffer 520 has filled, the decoded data output rate increases from Rate B to Rate C. Rate C could be equal to Rate A or the natural stream rate.

For example, the STB 284 can request a unicast data stream from the HE 130. The unicast data stream is sent at Rate A, a natural data rate of six megabytes per second, to the buffer 520 in the STB 284. Once the buffer 520 has begun to fill and reached a key frame, a first occupancy level has been reached. The buffer 520 begins to output data to the decoder at Rate B, which is four megabytes per second. When the buffer 520 has reached a second occupancy level, the STB 284 requests that the data flow from the HE 130 become a multicast data flow, which allows more information to be sent from the HE 130 to the STB 284. Once the buffer 520 is substantially full, a third occupancy level has been reached. The data output rate is increased to Rate C, which is equal to Rate A, the natural data rate.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the embodiments of the invention in logic embodied in hardware and/or software-configured mediums.

What is claimed is:

1. A method for buffering Moving Picture Exert Group (MPEG) digital signals of at least a unicast or a multicast data streams in a home communication terminal, the method comprising the steps of:
   reading data into a decoder buffer at a first data rate;
   obtaining a first occupancy level in said decoder buffer, wherein said first occupancy level is a level at which the decoder buffer reaches a key frame of MPEG;
   responsive to determining that the data in the decoder buffer includes the key frame and responsive to obtaining the first occupancy level, outputting data from said decoder buffer at a second data rate, wherein said second data rate is less than said first data rate, and displaying images on a display using data output at said second rate;
   obtaining a second occupancy level in said decoder buffer; and
   responsive to obtaining the second occupancy level, outputting data from said decoder buffer at a third data rate, wherein said third data rate is greater than said second data rate, and displaying images on the display using data output at the third data rate;
   wherein a channel alternation occurs as a result of said home communication terminal outputting said digital signals from said decoder buffer prior to said decoder buffer reaching said second occupancy level at said second data rate.

2. The method of claim 1, wherein said third data rate is equal to said first data rate.

3. The method of claim 1, wherein said first data rate is a data rate at which a data stream comprising the data is sent.

4. The method of claim 1, wherein said step of obtaining said second occupancy level comprises allowing said decoder buffer to fill.

5. The method of claim 1, wherein said step of obtaining said second occupancy level comprises obtaining a full decoder buffer.

6. The method of claim 1, further comprising tuning a home communications terminal to a multicast data stream and reading from said multicast data stream.

7. The method of claim 1, further comprising reading the key frame into said decoder buffer prior to outputting data from said decoder buffer at said second data rate.

8. The method of claim 1, further comprising tuning the home communications terminal to a unicast data stream and reading from said unicast data stream.

9. The method of claim 8, further comprising closing said unicast data stream upon reaching a second third occupancy level of said decoder buffer and tuning to a multicast data stream to be read into said decoder buffer.

10. A method for buffering Moving Picture Exert Group (MPEG) digital signals of at least a unicast or a multicast data stream in a home communication terminal, the method comprising the steps of:
    tuning to said unicast data stream;
    reading said unicast data stream into a buffer wherein said first occupancy level is a level at which the buffer reaches a key frame of MPEG;
    responsive to determining that the buffer includes a key frame and to obtaining the first occupancy level, outputting data from said buffer at a second data rate, wherein said second data rate is less than said first data rate, and displaying images on a display using data output at said second rate;
    obtaining a second occupancy level in said buffer, wherein said second occupancy level is greater than said first occupancy level;
    responsive to obtaining the second occupancy level, closing said unicast data stream;
    tuning to said multicast data stream;
    reading said multicast data stream into said buffer;
    obtaining a third occupancy level in said buffer, wherein said third occupancy level is greater than said second occupancy level; and
    responsive to obtaining the third occupancy level, outputting data from said buffer at a third data rate, wherein said third data rate is greater than said second data rate, and displaying images on the display using data output at the third data rate;
    wherein a channel alternation occurs as a result of said home communication terminal outputting said digital signals from said decoder buffer prior to said decoder buffer reaching said second occupancy level at said second data rate.

11. The method of claim 10, wherein said third data rate is equal to said first data rate.

12. The method of claim 10, wherein said first data rate is a data rate at which a data stream comprising the data is sent.

13. The method of claim 10, wherein a channel alteration occurs prior to said buffer being full.

14. The method of claim 10, further comprising reading the key frame into said buffer prior to outputting data from said buffer at said second data rate.

15. A decoder buffer apparatus facilitating fast channel change before the decoder buffer is full comprising receiving digital signals of at least a unicast or a multicast Moving Picture Exert Group (MPEG) data streams in a home communication terminal at a first data rate to obtain a first occupancy level that represents a partially full buffer, wherein said first occupancy level is a level at which the decoder buffer reaches a key frame of MPEG, for outputting said data at a second data rate which is less than said first data rate in response to the first occupancy level and in response to determining that the digital signals received at the first data rate include said key frame, and for obtaining a second occupancy level wherein said second occupancy level is greater than said first occupancy level in order to output said data for display at a third data rate that is greater than said second data rate; wherein a channel alternation occurs as a result of said home communication terminal outputting said digital signals from said decoder buffer prior to said decoder buffer reaching said second occupancy level at said second data rate.

16. The decoder buffer of claim 15, wherein said third data rate is equal to said first data rate.

17. The decoder buffer of claim 15, wherein said first data rate is a data rate at which a data stream comprising the digital signals is sent.

18. The decoder buffer of claim 15, wherein said second occupancy level is a full buffer.

19. The decoder buffer of claim 15, wherein channel alterations may occur a channel alteration occurs prior to said buffer being full.

* * * * *